3,318,847
POLYACETAL STABILISATION PROCESS
Charles Kenneth Warren, Welwyn Garden City, England, assignor to Imperial Chemical Industries Limited, London, England, a corporation of Great Britain
No Drawing. Filed Feb. 25, 1963, Ser. No. 260,884
Claims priority, application Great Britain, Mar. 2, 1962, 8,157/62
5 Claims. (Cl. 260—67)

The present invention relates to a stabilisation process and more particularly to a process for stabilising crystalline polyacetals and to the products so obtained.

Crystalline polyacetals are normally derived from the anionic addition polymerisation of aldehydes having two or more carbon atoms and they are useful as thermoplastic materials, particularly for the formation of films and fibres. However, they tend to lack the thermal stability normally required for many of the specialised uses of thermoplastic materials.

It is an object of the present invention to provide a process for increasing the thermal stability of some of these materials.

According to the present invention we provide a process in which a crystalline polymer, derived from the polymerisation of an aldehyde which contains at least two carbon atoms and in which at least one hydrogen atom is attached to the carbon atom attached to the carbonyl group, is treated with the anhydride of a carboxylic acid in liquid form in the presence of an organic base and in the absence or substantial absence of a solvent and is thereafter isolated and then subjected to a heat treatment at a temperature of at least 100° C. for at least one hour.

Our invention also comprises the products of this process.

Polymers formed from any such aldehydes may be used in our process but it is particularly effective for polymers derived from aldehydes having up to 10 carbon atoms. Examples are acetaldehyde, propionaldehyde, n-butyraldehyde, iso-butyraldehyde, n-valeraldehyde, iso-valeraldehyde, n-caproaldehyde, n-heptaldehyde and the like. Copolymers derived from the polymerisation of two or more such aldehydes may also be used.

Polymers formed from the polymerisation of such aldehydes normally have the structure

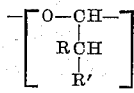

where R and R' may each be hydrogen or a monovalent hydrocarbon radical and $n$ is a positive integer. The polymer chain may be terminated by hydroxyl groups at one or both ends and the object of the reaction of the polymer with the carboxylic ahydride is to replace the hydroxyl groups by ester groups which are more stable to thermal degradation.

Polymers of the kind described are generally not as susceptible as polyoxymethylenes to ester formation by reaction with the anhydride of a carboxylic acid since the terminal hydroxyl groups of the polymer chains are secondary hydroxyl groups (as compared with primary hydroxyl groups in the case of polyoxymethylenes), and secondary hydroxyl groups are not normally as reactive as primary hydroxyl groups. For this reason, the reaction cannot be carried out effectively in solution or by using the anhydride in vapour form. A preferred method of effecting the esterification is by slurrying the polymer with the anhydride and heating the slurry. The reaction proceeds more effectively at elevated temperatures and a much preferred way of effecting the esterification is to boil the slurry mixture under reflux.

The polymers used in the process of the present invention cannot tolerate large amounts of acid as they tend to be subject to degradation under acid conditions and where there is a large amount of acid present, the degradation reaction may be more prevalent than the esterification process. Therefore, we prefer that the anhydride be used in amounts of not more than 20 parts by weight per part by weight of polymer and we prefer to use from 3 to 10 parts by weight.

The reaction normally takes from about 10 minutes to 1 hour although longer or shorter periods may be used if desired.

Any organic carboxylic acid anhydride may be used: the acids may be mono- or polyfunctional, for example hydroxylated acids or acids containing ethylenic unsaturation or dicarboxylic acids may be used, but we prefer to use monocarboxylic acids having no other functional group in the molecule since their use reduces the possibility of forming undesirable by-products which may not be easily removed and which may catalyse the degradation of the product. For convenience, we prefer to use anhydrides derived from the aliphatic mono-carboxylic acids, which may have alkyl or aryl substituents if desired. Examples are acetic acid, phenyl acetic acid, propionic acid, butyric acid, valeric acid, caproic acid, caprylic acid, lauric acid, myristic acid, pentadecanoic acid, palmitic acid, stearic acid and the like. We prefer to use the anhydrides of lower aliphatic carboxylic acids and further prefer acetic acid anhydride because of its ready availability. Mixed anhydrides such as propionic acid/acetic acid anhydride may also be used.

The reaction is catalysed by the presence of an organic base, preferably a tertiary amine such as trimethylamine, triphenylamine, diphenylmethylamine, cyclohexyldimethylamine, triethylamine, tripropylamine, quinoline, pyridine or N-phenyl morpholine. The base is normally used in amounts of 0.01 to 1.0 mole/mole of anhydride. Below 0.01 mole/mole, improvement by using the base is small while the use of amounts above about 1.0 mole/mole both are expensive and reduces the efficiency of the reaction. We find that very useful results are obtained using from 0.1 to 0.4 mole/mole.

When the reaction with the anhydride is complete, the polymer is isolated from the mixture by any suitable procedure such as filtration or fractionation followed by washing and the esterified polymer is then heated to a temperature of at least 100° C. It is preferred that the isolation treatment frees the polymer from substantially all the acid anhydride, since presence of the latter may tend to encourage degradation of the polymer at the elevated temperatures used during the heat treatment.

During the heat treatment, acid is evolved and is believed to have been split off from the polymer chains.

Although the treatment may be effective at temperatures below 100° C., the reaction is so slow as to be almost undetectable. Even at temperatures of 100° C. and just above, the rate of reaction is uneconomically slow and we prefer to effect the heat treatment at temperatures of at least 180° C. and further prefer to use temperatures of at least 200° C. since then the reaction may be terminated within a reasonable length of time. On the other hand, temperatures should not be too high since otherwise the polymer may be subjected to undesirable degradation. For this reason, it is generally preferred to use temperatures not higher than about 250° C.

As already mentioned, acid is evolved during the process and it is preferred to effect the heat treatment under conditions in which the acid is effectively removed and we therefore prefer to effect the heat treatment of the esterified polymer under reduced pressure or in the presence of an acid acceptor or preferably, both under conditions of reduced pressure and in the presence of an acid acceptor since then the reaction is particularly efficient.

Any suitable acid acceptors may be used during the heat treatment step but we have found it most suitable to use an amine which has a high boiling point (in order to reduce the risk of vaporisation of tthe amine during the reaction) and which is not subject to degradation under the conditions employed. Particularly suitable amines are laurylamine (B.P. 135° C. at 15 mm. Hg), o-phenylenediamine (B.P. 275° C.), m-phenylenediamine (B.P. 284° C.), p-phenylenediamine (B.P. 267° C.), p-phenetidine (B.P. 254° C.), diphenylamine (B.P. 302° C.) and triphenylamine (B.P. 401° C.).

It is preferred to carry out the heat treatment in an inert atmosphere and the time to complete the treatment varies with the effectiveness of the conditions used. Times will normally range from about 5 hours at the lower temperatures to about 1 hour at the higher temperatures.

At the end of the reaction, the medium is normally cooled and the polymer may then be separated and purified if desired by any suitable process such as filtration, centrifugation or recrystallisation from a suitable solvent. However, if the conditions for acid removal have been effective, the only contaminant is likely to be the amine which may act as a stabiliser for the polymer and, therefore, need not be removed.

The evolution of acid from the esterified polymer during the heat treatment indicates that a cracking process has occurred in which acid is split off leaving an unsaturated ether end group on the polymer chain:

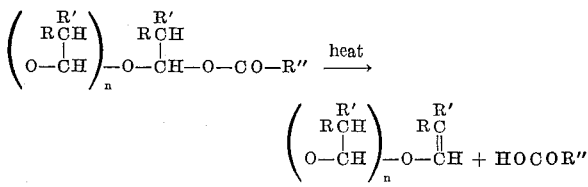

This is supported by infra-red analysis which is unable to detect the presence of carbonyl groups in the treated polymer but indicates that unsaturated ether groups are present.

The products of the invention are useful as thermoplastic materials particularly suitable for the production of shaped articles by moulding or extrusion, and films, fibres, filaments, pipes and other shapes may be formed.

Plasticisers, heat and light stabilisers, pigments, lubricants, mould release agents and other fillers may be incorporated in the products and they may also be blended with other suitable polymeric materials.

The invention is illustrated by the following examples in which all parts are expressed as parts by weight.

EXAMPLE 1

A. *Preparation and esterification of crystalline poly (n-butyraldehyde)*

0.695 part of a sodium alkoxide catalyst was added to a stirred solution of 79.2 parts of n-butyraldehyde in 62.6 parts of pentane at −78° C. under an atmosphere of nitrogen. After 2 days, a mixture of 34.6 parts of acetic anhydride and 7.86 parts of pyridine was added and the whole was allowed to warm to room temperature. The pentane was then removed by distillation and the residual mixture was refluxed for 40 minutes, cooled and filtered.

The product was a solid which, after washing with acetone and drying under 15 mm. Hg absolute pressure for 2 days, gave 28 parts of acetylated poly(n-butyraldehyde).

In order to estimate the thermal stability of the product, its reaction rate constant for thermal degradation at 140° C. ($k_{140}$) was measured and was found to be 0.0053% by weight per minute. At 220° C., however, the polymer degraded rapidly giving $k_{222}$ values on different samples ranging from 0.6 to 3.0% by weight per minute.

The value of the reaction rate constant for thermal degradation is determined by placing a weighed portion of the polymer in a test tube fitted with a stopper, an inlet tube and an outlet tube. Nitrogen is passed into the tube to displace any air in the tube which is then brought to the desired temperature (i.e. 140° C. or 222° C.), e.g. by placing the tube in the vapour of a liquid with a suitable boiling point or in an oven. While the tube is heated, a slow stream of nitrogen is continuously passed through the tube to flush out degradation products. After a given period of time, the tube is removed from the heating zone, cooled to room temperature and weighed. The tube is again flushed with nitrogen, and the cycle of heating, cooling and weighing repeated as often as desired.

The weight of polymer remaining in the tube after each heating period is plotted as the logarithm of the weight (or weight percent) of undegraded polymer as the ordinate against the corresponding time elapsed since the beginning of the degradation as the abscissa. The plotted values usually define a curve having two sections both almost straight lines: the first being fairly steep, denoting rapid degradation in the initial stages and the second, connected to the first by a sharply changing curve, being substantially shallower. The second portion of the curve represents the true character of the polymer and is the basis for calculating the reaction rate constant $k$ for thermal degradation. $k=2.303$ times the slope of the best straight line that will fit the plotted points forming the second portion of the curve and is expressed as percent by weight/minute.

B. *Heat treatment of acetylated poly(n-butyraldehyde)*

1 part of acetylated poly(n-butyraldehyde) formed as described in A above was stirred with a solution of 0.01 part of pyridine dissolved in 7.1 parts of ether for 18 hours and after the ether had been distilled off under reduced pressure, the polymer was heated at 222° C. in a slow stream of nitrogen for 1 hour. The product showed a $k_{222}$ value of only 0.29% by weight per minute.

The infra-red absorption spectra of the acetylated poly (n-butyraldehyde) before and after the heat treatment, and at intermediate stages during the heat treatment indicate that acetate groups are removed and are replaced by unsaturated ether groups. The strong absorption band at 5.75 microns, due to the presence of the acetate carbonyl groups, gradually disappears during the treatment while another band at 6.0 microns, ascribed to the presence of $\alpha,\beta$-unsaturated ether groups, increases progressively in intensity.

EXAMPLE 2

The process of Example 1B was repeated using diphenylamine in place of pyridine and the polymer produced after the heat treatment for 1 hour had a $k_{222}$ value of 0.024% by weight per minute.

EXAMPLE 3

11 parts of acetylated poly(n-butyraldehyde) formed as described in Example 1A were heat treated at 222° C. in vacuo for 5 hours during which time there was a weight loss of 2 parts. The $k_{222}$ value of the residual polymer was 0.44% by weight per minute reducing after 80 minutes to 0.21% by weight per minute.

I claim:

1. In a process for preparing a thermally stable crystalline polyacetal by treating a crystalline polymer derived from the polymerization of an aldehyde which contains from two to ten carbon atoms and in which at least one hydrogen atom is attached to the carbon atom attached to the carbonyl group with the anhydride of a carboxylic acid in liquid form in the presence of a tertiary amine and in the substantial absence of a solvent, the improvement of thereafter isolating the polyaldehyde dicarboxylate so obtained and subjecting the same to a heat treatment at a temperature of at least 180° C. for at least one hour under acid removal conditions to convert substantially the ester chain terminal groups to $\alpha,\beta$-monoethylenically unsaturated ether terminal groups.

2. A process according to claim 1 in which the heat treatment is effected in the presence of an amine having a boiling point above the temperature of the heat treatment.

3. A process according to claim 1 in which the heat treatment is effected at a temperature of from 180° C. to 250° C.

4. A process according to claim 3 in which the heat treatment is effected at a temperature of at least 200° C.

5. A thermally stable crystalline polyacetal whenever prepared by a process according to claim 1.

References Cited by the Examiner

UNITED STATES PATENTS

| | | | |
|---|---|---|---|
| 2,998,409 | 8/1961 | Nogare et al. | 260—67 |
| 3,001,966 | 9/1961 | Funck et al. | 260—67 |
| 3,184,433 | 5/1965 | Vogl | 260—67 |
| 3,207,727 | 9/1965 | Matsubayashi et al. | 260—67 |

OTHER REFERENCES

Kern et al.: Angewandte Chemie, 73, No. 6, pp. 177–186 (March 1961).

Vogl: Chemistry and Industry, June 3, 1961, pp. 748–749.

Novak et al.: Canadian Journal of Chemistry, vol. 37, October 1959, 1710–1721.

Stille: Introduction to Polymer Chemistry, Wiley Co., N.Y., 1962, pp. 139–147.

WILLIAM H. SHORT, *Primary Examiner.*

L. M. PHYNES, *Assistant Examiner.*